United States Patent
Tumblin

(10) Patent No.: US 11,263,307 B2
(45) Date of Patent: Mar. 1, 2022

(54) SYSTEMS AND METHODS FOR DETECTING AND MITIGATING CODE INJECTION ATTACKS

(71) Applicant: Digital Immunity LLC, Burlington, MA (US)

(72) Inventor: Henry R. Tumblin, Malden, MA (US)

(73) Assignee: Digital Immunity LLC, Burlington, MA (US)

(*) Notice: Subject to any disclaimer, the term of this patent is extended or adjusted under 35 U.S.C. 154(b) by 398 days.

(21) Appl. No.: 16/242,292

(22) Filed: Jan. 8, 2019

(65) Prior Publication Data
US 2019/0213323 A1    Jul. 11, 2019

Related U.S. Application Data

(60) Provisional application No. 62/614,616, filed on Jan. 8, 2018.

(51) Int. Cl.
| | | |
|---|---|---|
| *G06F 21/00* | (2013.01) | |
| *G06F 21/52* | (2013.01) | |
| *G06F 21/55* | (2013.01) | |
| *G06F 21/56* | (2013.01) | |
| *G06K 9/62* | (2022.01) | |

(52) U.S. Cl.
CPC .......... *G06F 21/52* (2013.01); *G06F 21/554* (2013.01); *G06F 21/562* (2013.01); *G06F 21/566* (2013.01); *G06K 9/6297* (2013.01); *G06F 2221/033* (2013.01)

(58) Field of Classification Search
CPC ...... G06F 21/52; G06F 21/554; G06F 21/562; G06F 21/566; G06F 2221/033; G06K 9/6297
See application file for complete search history.

(56) References Cited

U.S. PATENT DOCUMENTS

| | | | |
|---|---|---|---|
| 7,382,782 B1 * | 6/2008 | Ferguson | H04L 45/60 370/395.41 |
| 8,176,559 B2 | 5/2012 | Mathur et al. | |
| 8,968,486 B2 * | 3/2015 | Allen | A47L 15/4297 134/56 D |
| 9,003,501 B2 * | 4/2015 | Navaraj | H04L 63/1425 726/5 |
| 9,202,049 B1 | 12/2015 | Book et al. | |

(Continued)

OTHER PUBLICATIONS

Ye, N., "A Markov Chain Model of Temporal Behavior for Anomaly Detection", In Proceedings of the IEEE Workshop on Information Assurance and Security (IAS '00), West Point, NY, US, Jun. 6-7, 2000, pp. 171-174. (Year: 2000).*

(Continued)

*Primary Examiner* — Don G Zhao
(74) *Attorney, Agent, or Firm* — Anderson Gorecki LLP

(57) ABSTRACT

The present disclosure generally relates to computer security and malware protection. In particular, the present disclosure is generally directed towards systems and methods for detecting and mitigating a code injection attack. In one embodiment the systems and methods may detect a code injection attack by scanning identified sections of memory for non-operational machine instructions ("no-ops"), detecting a code injection attack based on the scan(s) and mitigating the code injection attack by taking one or more defensive actions.

14 Claims, 4 Drawing Sheets

(56) References Cited

U.S. PATENT DOCUMENTS

| | | | |
|---|---|---|---|
| 9,202,054 B1* | 12/2015 | Lu | G06F 21/566 |
| 9,438,623 B1* | 9/2016 | Thioux | H04L 63/1466 |
| 9,495,237 B1* | 11/2016 | Gschwind | G06F 12/00 |
| 9,514,301 B1* | 12/2016 | Gschwind | G06F 21/54 |
| 9,582,274 B1* | 2/2017 | Gschwind | G06F 9/30098 |
| 9,606,855 B1* | 3/2017 | Duvalsaint | G06F 9/30076 |
| 9,904,792 B1* | 2/2018 | Badishi | G06F 21/62 |
| 9,973,531 B1* | 5/2018 | Thioux | G06F 9/45558 |
| 9,996,694 B2* | 6/2018 | Sethumadhavan | G06F 21/52 |
| 10,013,557 B1* | 7/2018 | Grafi | H04L 63/1408 |
| 10,430,586 B1* | 10/2019 | Paithane | H04L 63/145 |
| 2006/0265578 A1* | 11/2006 | Modave | G06F 11/28 712/245 |
| 2007/0067840 A1* | 3/2007 | Young | G06F 21/554 726/22 |
| 2008/0016568 A1* | 1/2008 | Szor | G06F 21/564 726/22 |
| 2009/0144827 A1 | 6/2009 | Peinado et al. | |
| 2009/0165131 A1* | 6/2009 | Treadwell | G06F 21/566 726/22 |
| 2009/0300764 A1* | 12/2009 | Freeman | G06F 21/55 726/24 |
| 2009/0328200 A1* | 12/2009 | Phoha | G10L 17/16 726/19 |
| 2011/0219449 A1* | 9/2011 | St. Neitzel | G06F 11/00 726/23 |
| 2012/0023583 A1 | 1/2012 | Sallam | |
| 2014/0095883 A1* | 4/2014 | Kirillov | H04L 9/3247 713/176 |
| 2014/0344932 A1* | 11/2014 | Polychronakis | G06F 21/54 726/23 |
| 2015/0227742 A1* | 8/2015 | Pereira | G06F 21/56 726/24 |
| 2015/0317475 A1* | 11/2015 | Aguayo Gonzalez | G06F 21/55 726/23 |
| 2016/0004861 A1* | 1/2016 | Momot | G06F 21/552 726/23 |
| 2016/0085968 A1* | 3/2016 | Jakobsson | G06F 12/0875 726/23 |
| 2016/0117502 A1* | 4/2016 | Reed | G06F 21/56 726/23 |
| 2016/0328560 A1* | 11/2016 | Momot | G06F 9/30058 |
| 2016/0328563 A1* | 11/2016 | Kaufman | G06F 21/54 |
| 2016/0378986 A1* | 12/2016 | Livne | G06F 3/0673 726/23 |
| 2017/0192833 A1* | 7/2017 | Gschwind | G06F 11/0721 |
| 2017/0195353 A1* | 7/2017 | Taylor | G06F 12/0813 |

OTHER PUBLICATIONS

Bania, Piotr, et al. "Security Mitigations for Return-Oriented Programming Attacks", Kryptos Logic Research (www.kryptoslogic.com), 2000, 8 pages. (Year: 2000).*

International Search Report and Written Opinion on PCT Application No. PCT/US2019/012662, dated Mar. 28, 2019. 11 pages.

* cited by examiner

US 11,263,307 B2

SYSTEMS AND METHODS FOR DETECTING AND MITIGATING CODE INJECTION ATTACKS

CROSS-REFERENCE TO RELATED APPLICATIONS

This application claims priority to U.S. Provisional Application Ser. No. 62/614,616, filed Jan. 8, 2018, the content of which is incorporated herein by reference in its entirety.

TECHNICAL FIELD

The present disclosure generally relates to computer security and malware protection. In particular, the present disclosure is generally directed towards systems and methods for detecting and mitigating code injection attacks

BACKGROUND

A heap is an area of computer memory that a program (or "process") can access in order to store data in a variable amount. Blocks of memory in the heap may be dynamically allocated and de-allocated (i.e., allocated and freed in arbitrary order). The pattern of allocation and size of blocks within the heap are not known until run time. The total size of the heap may grow and shrink with use.

A heap spray attack is a malware attack where heap memory is sprayed by a series of non-operational machine instructions ("no-ops") that are followed by an executable portion of code. No-ops are computer instructions that do not define an operation, such as arithmetic operations with a zero operand. A sequence of no-ops instructions that are meant to "slide" a processor's instruction execution flow to a desired destination may be referred to as a no-op slide. The desired destination may include a transfer-of-control operation such as a return, jump, or call. The no-op slide may route the computer to executable code that causes the computer system to perform actions at the behest of the attacker, such as gaining root access.

Alternatively, the heap spray attack may function similar to a denial-of-service attack, where the volume of no-ops exceeds the volume of memory available in the heap, and a user is no longer able to run a program. Accordingly, heap spraying may be used to trigger an unrelated code vulnerability, such as a buffer over-flow.

Heap spray attacks have been used to attack applications that provide user-scripting capability, such as Web Browsers, Adobe reader, Windows OS components and the like. It is expected that the prevalence of heap spray attacks will continue to increase.

Heap spray attacks may be classified as a type of code injection attack. Other code injection attacks can include attacks based on injection of foreign code using dynamically-linked libraries (DLLs), and attacks based on the use of malicious scripts (e.g., JavaScript).

SUMMARY

Accordingly, there is a need for computer systems and methods that can detect and mitigate a code injection attack. Discussed herein are system and methods for detecting and mitigating a code injection attack. Some embodiments of the present disclosure may be described in terms of mitigating heap spray attacks, however a skilled artisan will understand that the systems and methods disclosed herein can be applied to detect and mitigate other types of code injection attacks, including but not limited to attacks based on injection of foreign code using dynamically-linked libraries (DLLs), and attacks based on the use of malicious scripts (e.g., JavaScript).

In some embodiments, an electronic computer system for detecting a code injection attack includes a processor, and at least one non-transitory computer-readable memory communicatively coupled to the processor. The processing instructions encoded in the at least one non-transitory computer-readable memory, when executed by the processor, may be operable to perform operations including: scanning one or more sections of the computer-readable memory for computer instructions that do not define an operation, detecting a heap spray attack based on the scanned one or more sections, and mitigating the heap spray attack by taking one or more defensive actions.

In some embodiments, a system for detecting and mitigating a heap spray attack may detect a heap spray attack based on the scanned one or more sections by determining a number of computer instructions that do not define an operation in the scanned one or more sections, and determining whether the number of computer instructions that do not define an operation exceeds a no-ops threshold. In some embodiments, detecting a heap spray attack based on the scanned one or more sections includes determining a number of computer instructions that do not define an operation in the scanned one or more sections, determining a total number of computer instructions in the scanned one or more sections, and determining whether the determined number of computer instructions that do not define an operation in the scanned one or more sections exceeds a threshold percentage of the determined total number of computer instructions in the scanned one or more sections. In some embodiments, detecting a heap spray attack based on the scanned one or more sections includes determining a spatial locality metric for the computer instructions that do not define an operation in the scanned one or more sections, and determining whether the spatial locality metric exceeds a spatial locality threshold. In some embodiments, mitigating the heap spray attack includes terminating execution of the computer program. In some embodiments, mitigating the heap spray attack includes isolating one or more portions of the scanned one or more sections. In some embodiments, detecting the heap spray attack includes applying a Hidden Markov Model (HMM).

In some embodiments, a non-transitory computer-readable medium stores instructions for detecting a heap spray attack. The instructions, when executed by a processor, may be configured to scan one or more sections of one of the computer-readable memory or computer instructions that do not define an operation, detect a heap spray attack based on the scanned one or more sections, and mitigate the detected heap spray attack by taking one or more defensive actions.

In some embodiments, the instructions to detect a heap spray attack based on the scanned one or more sections may include instructions to determine a number of computer instructions that do not define an operation in the scanned one or more sections and determine whether the number of computer instructions that do not define an operation exceeds a no-ops threshold. In some embodiments, the instructions to detect a heap spray attack based on the scanned one or more sections includes instructions to determine a number of computer instructions that do not define an operation in the scanned one or more sections, determine a total number of computer instructions in the scanned one or more sections, and determine whether the determined number of computer instructions that do not define an operation in the scanned one or more sections exceeds a threshold percentage of the determined total number of computer instructions in the scanned one or more sections. In some embodiments, the instructions to detect a heap spray attack based on the scanned one or more sections includes instructions to determine a spatial locality metric for the computer instructions that do not define an operation in the scanned one or more sections, and determine whether the spatial locality metric exceeds a spatial locality threshold. In some embodiments, the instructions to mitigate the heap spray attack includes terminating execution of the computer program. In some embodiments instructions to mitigate the heap spray attack includes isolating one or more portions of the scanned one or more sections. In some embodiments, instructions to detect the heap spray attack includes applying a Hidden Markov Model (HMM).

In some embodiments, a method for detecting a heap spray attack includes the steps of scanning one or more sections of one of at least one non-transitory computer-readable memory for computer instructions that do not define an operation, detecting a heap spray attack based on the scanned one or more sections, and mitigating the heap spray attack by taking one or more defensive actions. Embodiments may detect a heap spray attack based on the scanned one or more sections by determining a number of computer instructions that do not define an operation in the scanned one or more sections, and determining whether the number of computer instructions that do not define an operation exceeds a no-ops threshold. Detecting a heap spray attack based on the scanned one or more sections may include determining a number of computer instructions that do not define an operation in the scanned one or more sections, determining a total number of computer instructions in the scanned one or more sections, and determining whether the determined number of computer instructions that do not define an operation in the scanned one or more sections exceeds a threshold percentage of the determined total number of computer instructions in the scanned one or more sections.

In some embodiments a method for detecting a heap spray attack based on the scanned one or more sections includes determining a spatial locality metric for the computer instructions that do not define an operation in the scanned one or more sections, and determining whether the spatial locality metric exceeds a spatial locality threshold. Further, mitigating the heap spray attack may include at least one of terminating execution of the computer program, and isolating one or more portions of the scanned one or more sections. Detecting the heap spray attack may include applying a Hidden Markov Model (HMM).

DETAILED DESCRIPTION

Figure 1:
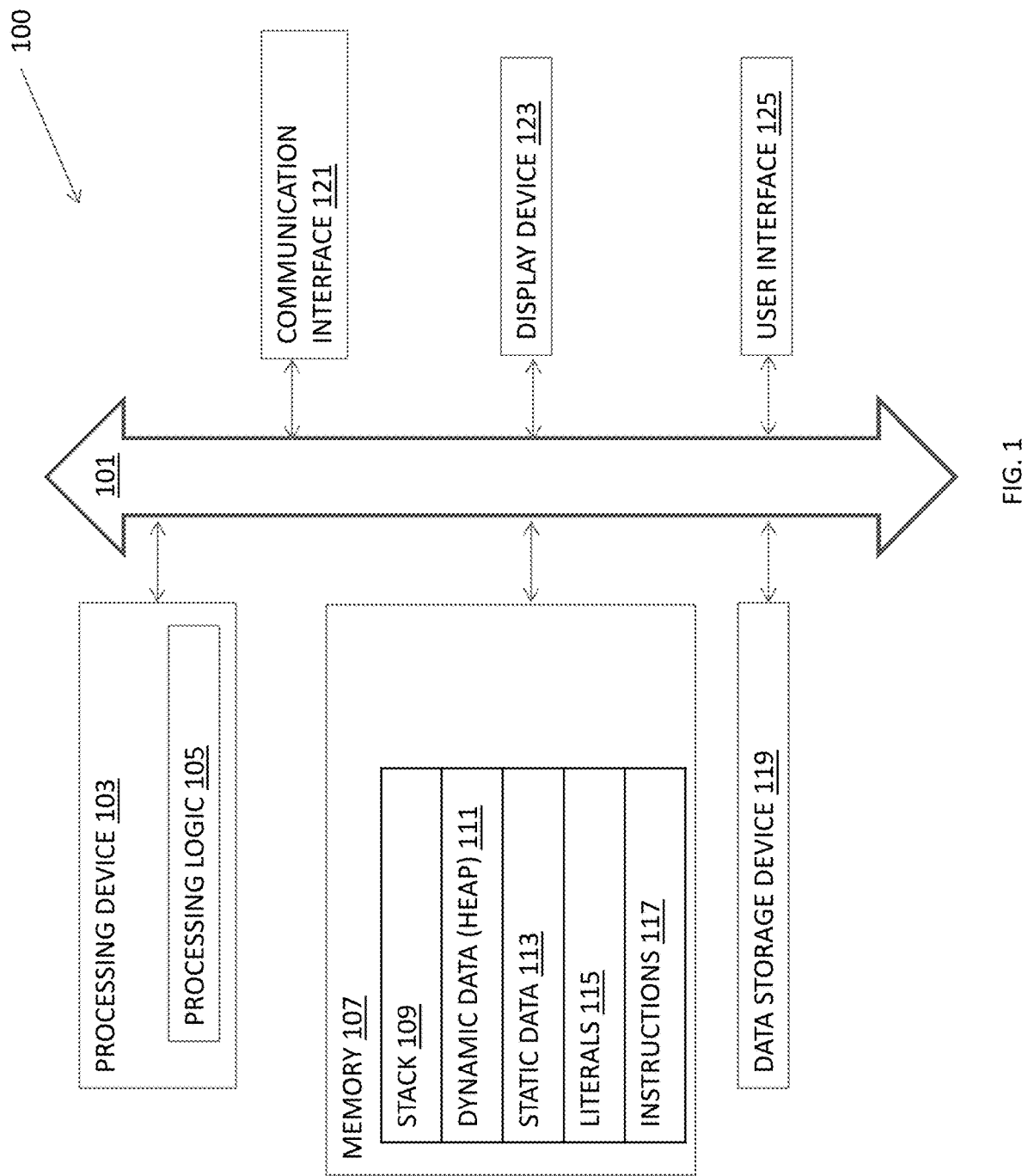
FIG. 1 is a block diagram of an electronic computer system in accordance with an aspect of the present disclosure.

FIG. 1 illustrates a computer system 100 configured to perform any one or more of the methodologies, processes or functions discussed herein. Illustrative computer system 100 may include a processing device 103 having processing logic 105; and a memory 107 having application-related memory components 127 including a stack memory 109, dynamic data or heap memory 111, static data 113, literals 115, and instructions 117. The memory 107 may also include a scanning module 129 configured to detect and mitigate a heap spray attack. A scanning module 129 may monitor the application-related memory components 127 for a single application, or across multiple applications. Additionally, the memory components for a single application may be monitored by a single or multiple scanning modules 129. The computer system 100 may also include a data storage device 119, a communication interface 121, a display device 123 and/or a user interface 125. In one embodiment, the components of the computer system 100 may be communicatively coupled via a system bus 101.

In some embodiments, processing device 103 may include, without being limited to, a microprocessor, a central processing unit, an application specific integrated circuit (ASIC), a field programmable gate array (FPGA), a digital signal processor (DSP) and/or a network processor. Processing device 103 may be configured to execute processing logic 105 for performing the operations described herein. In general, processing device 103 may include any suitable special-purpose processing device specially programmed with processing logic 105 to perform the operations described herein.

In certain embodiments, memory 107 may include, for example, without being limited to, at least one of a read-only memory (ROM), a random access memory (RAM), a flash memory, a dynamic RAM (DRAM) and a static RAM (SRAM), storing computer-readable instructions 117 executable by processing device 103. In general, memory 107 may include any suitable non-transitory computer-readable storage medium storing computer-readable instructions 117 executable by processing device 103 for performing the operations described herein. Although one memory device 107 is illustrated in FIG. 1, in some examples, computer system 100 may include two or more memory devices (e.g., dynamic memory and static memory).

Computer system 100 may include communication interface device 121, for direct communication with other computers (including wired and/or wireless communication), and/or for communication with network. In some examples, computer system 100 may include display device 123 (e.g., a liquid crystal display (LCD), a touch sensitive display, etc.). In some examples, computer system 100 may include user interface 125 (e.g., an alphanumeric input device, a cursor control device, etc.).

In some examples, computer system 100 may include data storage device 119 storing instructions (e.g., software) for performing any one or more of the functions described herein. Data storage device 119 may include any suitable non-transitory computer-readable storage medium, including, without being limited to, solid-state memories, optical media and magnetic media.

In some examples, the computer system 100 may be connected (e.g., networked) to other computer systems. The machine may operate in the capacity of a server or a client computer system in a client-server network environment, or as a peer computer system in a peer-to-peer (or distributed) network environment. The computer system may be any special-purpose computer system capable of executing a set of instructions (sequential or otherwise) that specify actions to be taken by that computer system for performing the functions describe herein. Further, while only a single computer system is illustrated, the term "computer system" shall also be taken to include any collection of computer systems that individually or jointly execute a set (or multiple sets) of instructions to perform any one or more of the methodologies discussed herein.

Figure 2:
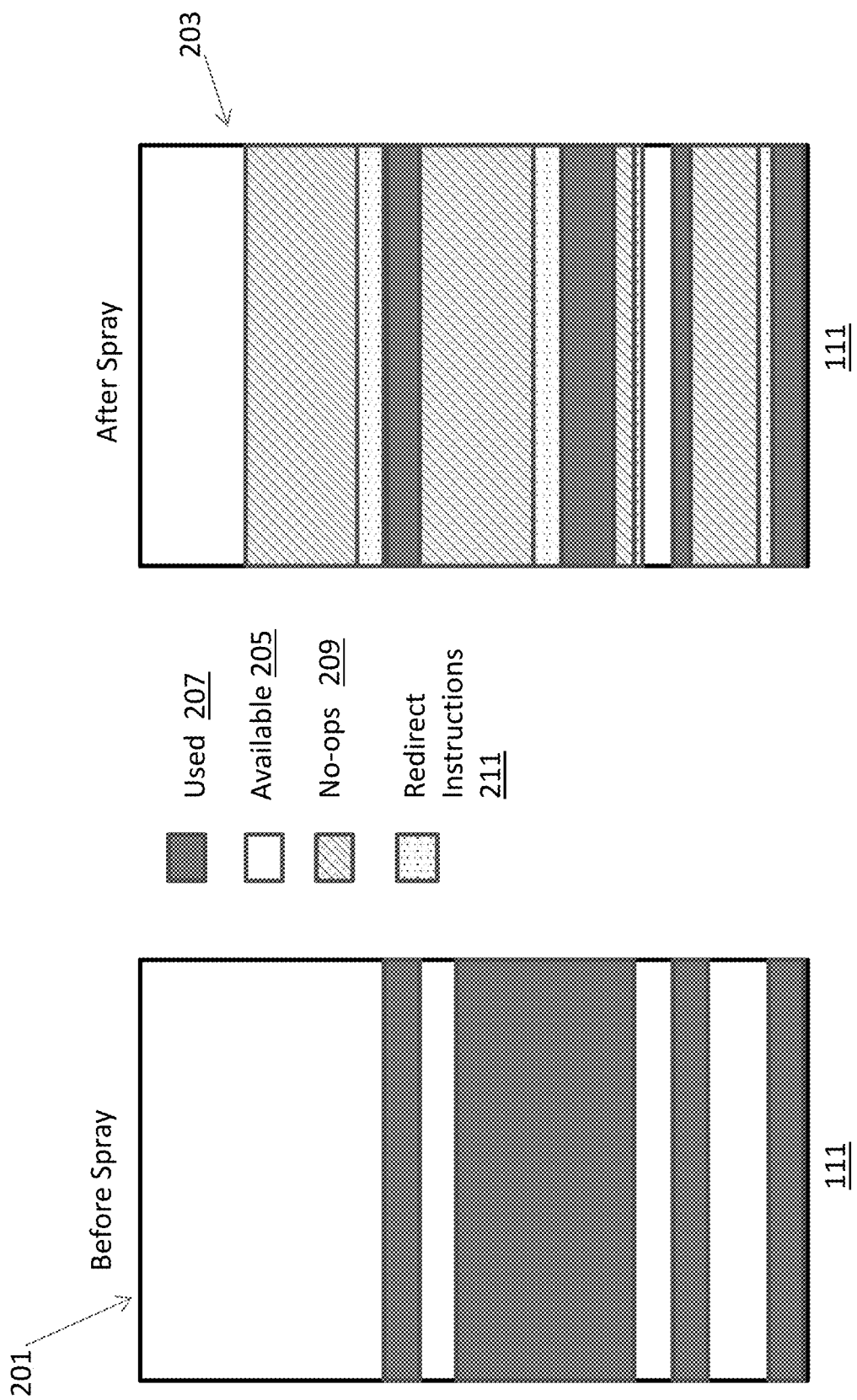
FIG. 2 is a diagram of an illustrative computer program memory before and after a heap spray attack, in accordance with an aspect of the present disclosure.

FIG. 2 illustrates a heap memory 111 before 201 and after 203 a heap spray attack. As illustrated in the before 201 panel, the heap memory 111 may include portions of memory that are used 207 or available 205. As a program dynamically allocates and deallocates memory in the heap 111, the used portions 207 may become separated from the available portions 205 of memory. Accordingly, a heap spray attacker may heap spray different sections of the heap, such that the probability that the computer program processes the malicious code in the heap spray increases. After a heap 111 is sprayed, the heap 111 may contain portions of memory that are used 207, available 205, no-ops 209 and redirect instructions 211. The redirect instructions 211 may reroute the computer to executable code that causes the computer system to perform actions at the behest of the attacker. The redirect instructions 211 may be injected into the heap 111 by the heap spray attacker along with the no-ops 209.

Figure 3:
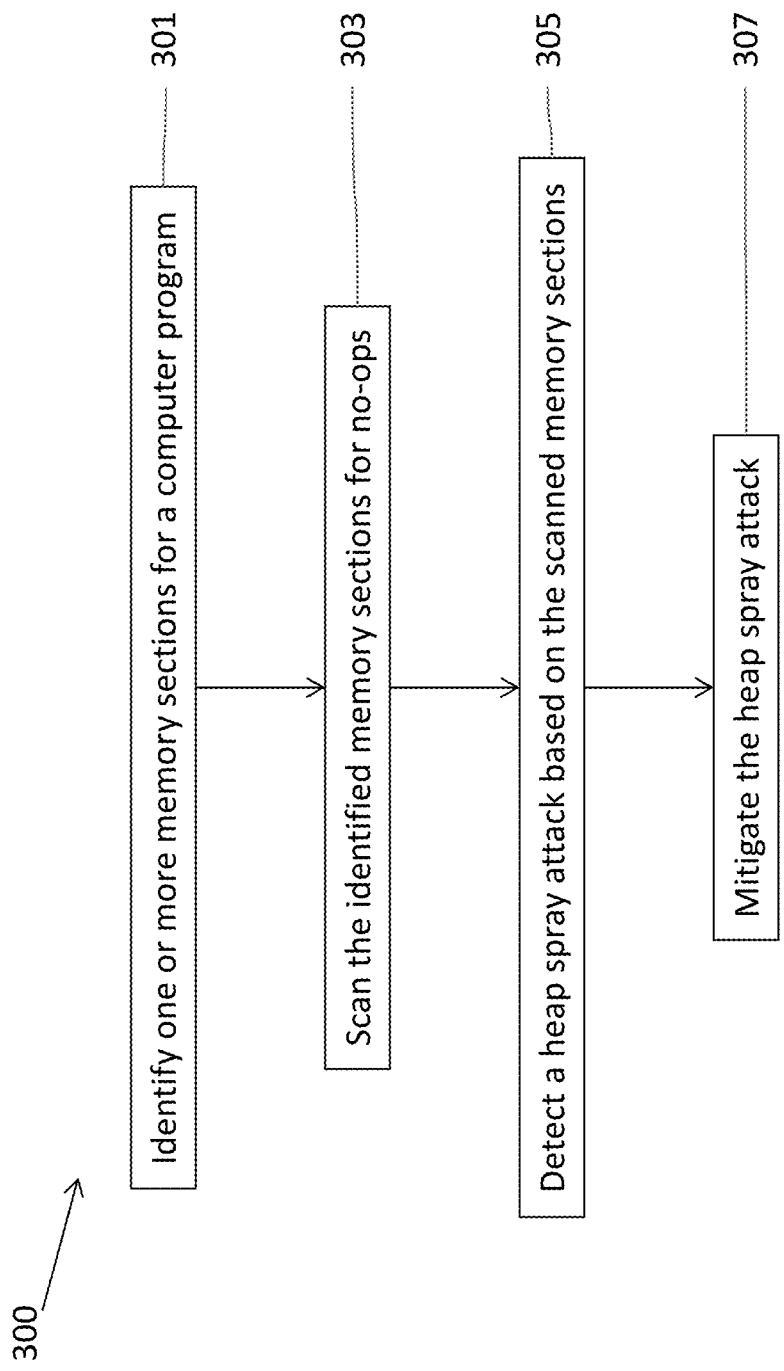
FIG. 3 is a flow diagram of a method for detecting and mitigating a heap spray attack, in accordance with an aspect of the present disclosure.

FIG. 3 illustrates a process for detecting and mitigating against a heap spray attack on an electronic computer system. In various embodiments the process 300 may be performed by an electronic computer system 100 such as the one illustrated in FIG. 1. In particular the process 300 may be performed at least in part by a scanning module 129 such as the one illustrated in FIG. 1. At 301 the computer system may identify one or more memory sections for a computer program. At 303 the computer system may scan the identified one or more memory sections for no-ops. In one embodiment, step 303 may be carried out by a scanning module such as scanning module 129 illustrated in FIG. 1. The scanning module 129 may be configured to continuously monitor the execution of an application while in memory 107 and perform one or more scans responsive to determining that an application has performed a system call such as a filtering call in a Windows operating system. During the scan, in one embodiment, the application program may be temporarily interrupted. A person skilled in the art would recognize that similar system calls in other operating systems may also be monitored and used to trigger scans. Due to the random nature of system calls within an application, scans may be performed at random intervals that are unknown to the heap spray attacker. Accordingly, the heap spray attack is less able to plan for scans and undermine the heap spray attack countermeasures described herein. At 305 the computer system may detect a heap spray attack in the scanned memory sections. This may entail the computer system looking at the scanned memory sections to see if the scanned memory sections contain no-ops patterns that are associated with heap spray attacks. At 307 the computer system may mitigate the heap spray attack 307 in the event that a heap spray attack has been detected. Mitigating the heap spray attack 307 may include taking one or more defensive actions such as providing a notification or alarm to a user of the computer system and/or isolating the no-ops.

As discussed above, at 305 the computer system may detect a heap spray attack in the scanned memory sections by looking at the scanned memory sections to see if the scanned memory sections contain no-ops patterns that are associated with heap spray attacks. No-ops patterns that are associated with heap spray attacks may be pre-configured or stored in a scanning module such as scanning module 129. The pre-configured no-ops patterns may be downloaded from a central server, and may include patterns that are computer architecture (e.g., Intel, ARM) specific. The no-ops patterns may also be user configured by an administrator or user. The administrator or user may add new or change existing no-op patterns. Furthermore, no-ops patterns may be generated using machine learning techniques that analyze prior no-ops patterns and behavior of a single computer, across an enterprise or across multiple enterprises.

An application process may have one or more heap memory 111 allocations, each having one or more heap segments. To scan a particular application for a heap spray attack, in one embodiment, all corresponding heap segments of the process may be scanned. Alternatively, a subset of an application process's heap segments may be scanned. In another alternative, multiple processes' heap segments may be scanned. Scans may be generally run by a scanning module at any frequency appropriate to detect heap spray attacks. In one embodiment, scans may be run at a frequency that is determined based on the monitored application calls. For example, the scanning module may run a scan every time a system call is intercepted.

Figure 4:
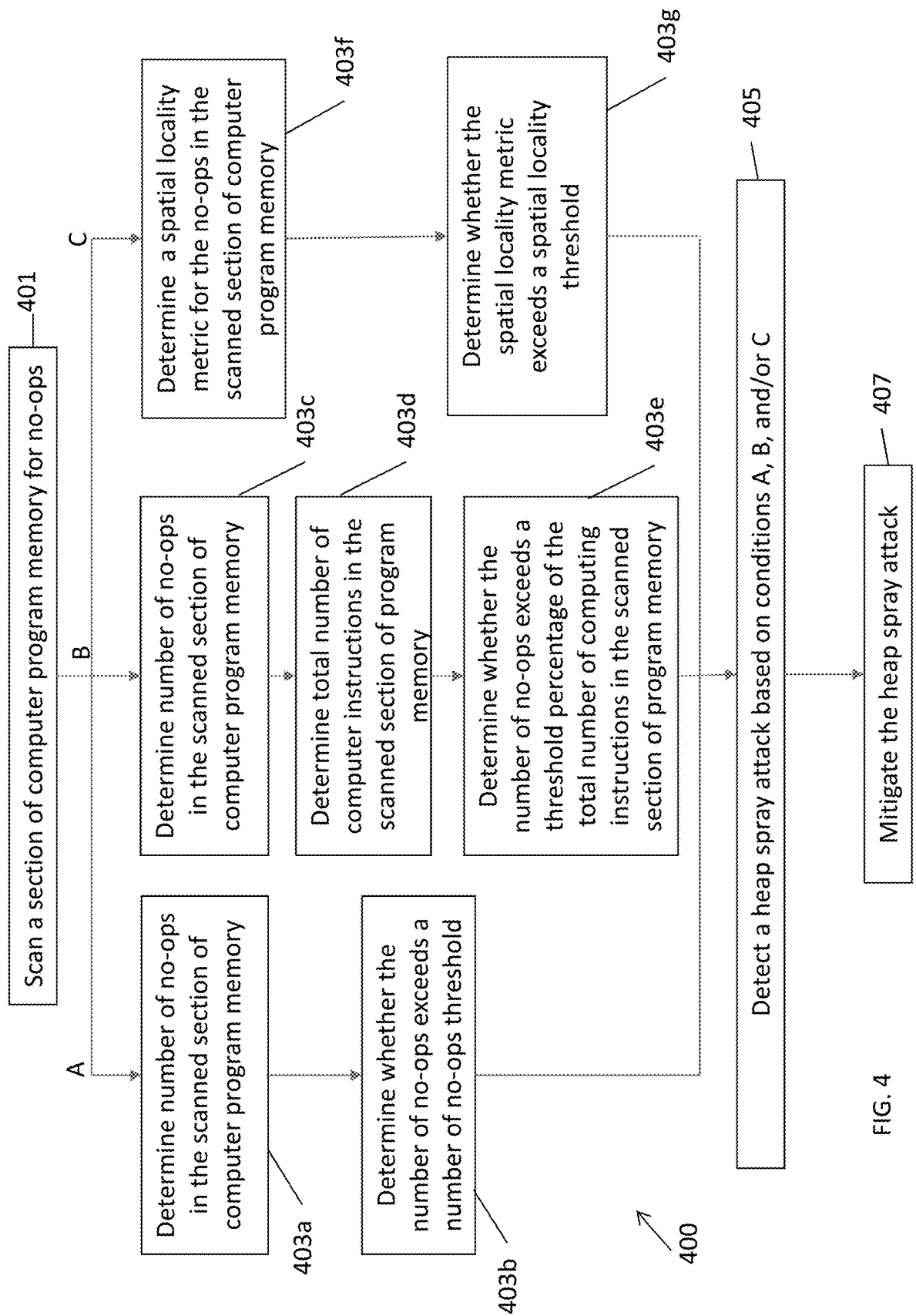
FIG. 4 is a flow diagram of another method for detecting and mitigating a heap spray attack, in accordance with an aspect of the present disclosure.

FIG. 4 illustrates a process 400 for detecting and mitigating against a heap spray attack on an electronic computer system in connection with a particular embodiment. At step 401 the computer system may scan a section of computer program memory for no-ops. The computer system may then determine the presence of a heap spray in the scanned section of computer program memory by performing one or more series of steps illustrated as conditions A, B, and C.

In condition A, the computer system may perform a first series of steps. In particular, at step 403a the computer system may determine the number of no-ops in the scanned section of computer program memory and then at step 403b determine whether the number of no-ops exceeds a number of no-ops threshold. In one embodiment, the threshold may be predetermined and stored in a memory of the computer system. If it is determined at step 403b that the number of no-ops exceeds a threshold, the computer system may provide an indication that there is a heap spray present in the scanned section of computer program memory.

In condition B, the computer system may perform a second series of steps. In particular, the computer system at step 403c may determine the number of no-ops in the scanned section of computer program memory, at step 403d the computer system may then determine the total number of computer instructions in the scanned section of computer program memory, and at step 403e the computer system may determine whether the number of no-ops exceeds a threshold percentage of the total number of computing instructions in the scanned section of memory. Step 403e may involve comparing the determined number of no-ops to the determined total number of computer instructions and calculating a percentage corresponding to the number of no-ops divided by the total number of computer instructions. Furthermore, step 403e may involve comparing the calculated percentage with a threshold percentage. In one embodiment the threshold percentage may be predetermined and stored in a memory of the computer system. If it is determined at step 403e that the number of no-ops exceeds a threshold percentage of the total number of computing instructions, then the computer system may provide an indication that there is a heap spray present in the scanned section of computer program memory.

In condition C, the computer system may perform a third series of steps. In particular, the computer system at step 403f may determine a spatial locality metric for the no-ops in the scanned section of computer program memory. At step 403g the computer program may determine whether the spatial locality metric exceeds a spatial locality threshold. If it is determined at step 403g that the no-ops within the scanned section of computer program memory are adjacently located then the computer system may provide an indication that there is a heap spray present in the scanned section of computer program memory.

At step 405 the computer system may detect the presence of a heap spray attack in the scanned section of computer program memory based on conditions A, B, and/or C. If one or more of the series of steps provides an indication that there is a heap spray present in the scanned section of the computer program memory, then the computer system may detect the presence of a heap spray attack.

If, at step 405, the computer system determines the presence of a heap spray in the scanned section of computer program memory the computer system may proceed to step 407 and mitigate a heap spray attack. Mitigating a heap spray attack 307 may include taking one or more defensive actions such as providing a notification or alarm to a user of the computer system and/or isolating the no-op sections within the section of computer program memory. Defensive actions may also include terminating the process by flushing it from memory. In one embodiment, providing a notification or alarm to a user of the computer system may include recording the forensic information associated with the heap spray attack but allowing the heap spray attack to continue running.

In addition to or alternatively to the three series of steps illustrated in FIG. 4, the computer system may detect heap spray attacks by utilizing Hidden Markov Model (HMM) and neural networks techniques. In one embodiment, the computer system may utilize machine learning techniques to dynamically learn new patterns of heap spray attacks (i.e., no-ops patterns), capture forensic data and transmit the patterns and captured data to a central database. In one embodiment, the patterns and captured data on the central database may be shared across an enterprise or multiple enterprise customers.

The systems and methods described herein may be implemented on any suitable operating system including for example, Windows, Linux, and iOS.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

The invention claimed is:

1. An system for detecting a code injection attack comprising:
a processor; at least one non-transitory computer-readable memory communicatively coupled to the processor; and processing instructions for a computer program, the processing instructions encoded in the computer-readable memory, the processing instructions, when executed by the processor, operable to perform operations comprising:
learning patterns of non-operational machine instructions indicative of heap spray attacks using one or more machine learning techniques that analyze prior non-operational machine instruction patterns and behavior across multiple enterprises of computers;
scanning one or more sections of the computer-readable memory for computer instructions comprising non-operational machine instructions that satisfy at least one pattern of the learned patterns of non-operational machine instructions;
detecting a code injection attack based on the scanned one or more sections by identifying a pattern of non-operational machine instructions based on the learning;
determining a number of computer instructions that do not define an operation in the scanned one or more sections;
detecting a code injection attack based on the number of computer instructions that do not define an operation exceeding a no-ops threshold;
determining a total number of computer instructions in the scanned one or more sections;
detecting a code injection attack based on the determined number of computer instructions that do not define an operation in the scanned one or more sections exceeding a threshold percentage of the determined total number of computer instructions in the scanned one or more sections; and
mitigating the code injection attack by taking one or more defensive actions.

2. The system of claim 1 wherein detecting a code injection attack based on the scanned one or more sections comprises:
determining a spatial locality metric for the computer instructions that do not define an operation in the scanned one or more sections; and
determining whether the spatial locality metric exceeds a spatial locality threshold.

3. The system of claim 1 wherein mitigating the code injection attack comprises terminating execution of the computer program.

4. The system of claim 1, wherein mitigating the code injection attack comprises isolating one or more portions of the scanned one or more sections.

5. The system of claim 1, wherein detecting the code injection attack comprises applying a Hidden Markov Model (HMM).

6. A non-transitory computer-readable medium storing instructions for detecting a code injection attack, the instructions, when executed by a processor, configured to:
learn patterns of non-operational machine instructions indicative of heap spray attacks using one or more machine learning techniques that analyze prior no-ops patterns and behavior across multiple enterprises of computers;
scan one or more sections of one of the computer-readable memory or computer instructions comprising non-operational machine instructions that satisfy at least one pattern of the learned patterns of non-operational machine instructions;
detect a code injection attack based on the scanned one or more sections by identifying a pattern of non-operational machine instructions based on the learning;
determine a number of computer instructions that do not define an operation in the scanned one or more sections;
detect a code injection attack based on the number of computer instructions that do not define an operation exceeding a no-ops threshold;
determine a total number of computer instructions in the scanned one or more sections;
detect a code injection attack based on the determined number of computer instructions that do not define an operation in the scanned one or more sections exceeding a threshold percentage of the determined total number of computer instructions in the scanned one or more sections; and mitigate the detected code injection attack by taking one or more defensive actions.

7. The non-transitory computer-readable medium of claim 6, wherein the instructions to detect a code injection attack based on the scanned one or more sections comprises instructions to:
   determine a spatial locality metric for the computer instructions that do not define an operation in the scanned one or more sections; and
   determine whether the spatial locality metric exceeds a spatial locality threshold.

8. The non-transitory computer-readable medium of claim 6, wherein the instructions to mitigate the code injection attack comprises terminating execution of a computer program affected by the code injection attack.

9. The non-transitory computer-readable medium of claim 6, wherein the instructions to mitigate the code injection attack comprises isolating one or more portions of the scanned one or more sections.

10. The non-transitory computer-readable medium of claim 6, wherein the instructions to detect the code injection attack comprises applying a Hidden Markov Model (HMM).

11. A method for detecting a code injection attack comprising:
   learning patterns of non-operational machine instructions indicative of heap spray attacks using one or more machine learning techniques that analyze prior no-ops patterns and behavior across multiple enterprises of computers:
   scanning one or more sections of one of at least one non-transitory computer-readable memory for computer instructions comprising non-operational machine instructions that satisfy at least one pattern of the learned patterns of non-operational machine instructions;
   detecting a code injection attack based on the scanned one or more sections by identifying a pattern of non-operational machine instructions based on the learning; and mitigating the code injection attack by taking one or more defensive actions;
   determining a number of computer instructions that do not define an operation in the scanned one or more sections;
   detecting a code injection attack based on whether the number of computer instructions that do not define an operation exceeds a no-ops threshold;
   determining a total number of computer instructions in the scanned one or more sections; and
   detecting a code injection attack based on whether the determined number of computer instructions that do not define an operation in the scanned one or more sections exceeds a threshold percentage of the determined total number of computer instructions in the scanned one or more sections.

12. The method of claim 11 wherein detecting a code injection attack based on the scanned one or more sections comprises:
   determining a spatial locality metric for the computer instructions that do not define an operation in the scanned one or more sections; and
   determining whether the spatial locality metric exceeds a spatial locality threshold.

13. The method of claim 11 wherein mitigating the code injection attack comprises at least one of terminating execution of a computer program affected by the code injection attack, and isolating one or more portions of the scanned one or more sections.

14. The method of claim 11, wherein detecting the code injection attack comprises applying a Hidden Markov Model (HMM).

* * * * *